(12) United States Patent
Liu et al.

(10) Patent No.: US 11,148,589 B2
(45) Date of Patent: Oct. 19, 2021

(54) VEHICLE DOME LIGHT

(71) Applicant: KARMA AUTOMOTIVE LLC, Irvine, CA (US)

(72) Inventors: Zhinan Liu, Costa Mesa, CA (US); Andre Franco Luis, Orange, CA (US); Andreas Thurner, Irvine, CA (US)

(73) Assignee: KARMA AUTOMOTIVE LLC, Irvine, CA (US)

(*) Notice: Subject to any disclaimer, the term of this patent is extended or adjusted under 35 U.S.C. 154(b) by 0 days.

(21) Appl. No.: 16/376,865

(22) Filed: Apr. 5, 2019

(65) Prior Publication Data

US 2020/0317120 A1 Oct. 8, 2020

(51) Int. Cl.
| | |
|---|---|
| *B60Q 3/51* | (2017.01) |
| *B60Q 3/20* | (2017.01) |
| *B60Q 3/47* | (2017.01) |
| *B60Q 3/74* | (2017.01) |
| *F21K 9/68* | (2016.01) |
| *F21Y 115/10* | (2016.01) |
| *F21W 106/00* | (2018.01) |

(52) U.S. Cl.
CPC ............... *B60Q 3/51* (2017.02); *B60Q 3/20* (2017.02); *B60Q 3/47* (2017.02); *B60Q 3/74* (2017.02); *F21K 9/68* (2016.08); *F21W 2106/00* (2018.01); *F21Y 2115/10* (2016.08)

(58) Field of Classification Search
CPC ... B60Q 3/51; B60Q 3/20; B60Q 3/54; B60Q 3/74; F21W 2106/00; F21K 9/68; F21V 7/0008; F21V 7/0016

USPC ........................................................ 362/490
See application file for complete search history.

(56) References Cited

U.S. PATENT DOCUMENTS

| | | | |
|---|---|---|---|
| 2,582,738 A * | 1/1952 | Arenberg | F21V 7/0016 362/484 |
| 4,517,631 A | 5/1985 | Mullins | |
| 5,097,401 A | 3/1992 | Eppler | |
| 6,402,354 B1 | 6/2002 | Tatewaki et al. | |
| 8,096,688 B2 * | 1/2012 | Kino | B60Q 3/82 362/136 |
| 2004/0252521 A1 * | 12/2004 | Clark | F21V 5/002 362/554 |
| 2006/0279959 A1 * | 12/2006 | Yabashi | B60Q 3/57 362/490 |

(Continued)

*Primary Examiner* — Rajarshi Chakraborty
*Assistant Examiner* — Michael Chiang
(74) *Attorney, Agent, or Firm* — Gordon Rees Scully Mansukhani, LLP

(57) ABSTRACT

A vehicle roof lighting unit for illuminating an interior compartment of the vehicle. The unit includes one or more direct light emitting elements, wherein each of the direct light emitting elements are configured to illuminate a portion of the interior compartment, and wherein the one or more direct light emitting elements are located on the exterior of the vehicle roof lighting unit. The unit also includes one or more indirect light emitting elements for providing general lighting for the entire interior compartment, wherein the one or more indirect light emitting elements are concealed from view and the light from the one or more indirect light emitting elements reflects off a curved reflective structure. The unit further includes a control panel, wherein the control panel is located on the exterior of the vehicle roof lighting unit.

17 Claims, 5 Drawing Sheets

(56) References Cited

U.S. PATENT DOCUMENTS

| | | | |
|---|---|---|---|
| 2010/0188838 A1* | 7/2010 | Yajima | B60Q 3/74 |
| | | | 362/84 |
| 2011/0222302 A1* | 9/2011 | Hodgson | B60Q 3/80 |
| | | | 362/490 |
| 2015/0166178 A1* | 6/2015 | Savian | B60Q 3/44 |
| | | | 244/118.6 |
| 2017/0029112 A1* | 2/2017 | O'Kell | B64D 11/00 |
| 2018/0029531 A1* | 2/2018 | Di Trapani | B60Q 3/208 |
| 2018/0098399 A1* | 4/2018 | Takeshita | G02B 6/0025 |
| 2019/0054856 A1* | 2/2019 | Salter | B60Q 3/208 |
| 2019/0072820 A1* | 3/2019 | Lerman | G02B 6/0055 |
| 2019/0346089 A1* | 11/2019 | Rashidi Doust | G02B 6/0088 |
| 2019/0376653 A1* | 12/2019 | Dussaume | F21K 9/65 |

\* cited by examiner

VEHICLE DOME LIGHT

BACKGROUND

The present application relates to a vehicle interior roof lighting unit, wherein the vehicle roof lighting unit uses direct and indirect lighting and the light from the indirect lighting is reflected and diffused through a semi-transparent material.

Passenger vehicles traditionally have an interior lighting unit installed to increase the ease of access and use for vehicle occupants. Though the lighting units take many forms, they commonly include lighting units mounted and installed as roof lighting and used to illuminate the vehicle cabin or compartment when the vehicle is in a dark environment and occupants are entering or exiting the vehicle, meaning that the vehicle is at a complete stop. It is also possible to operate a vehicle roof lighting unit while the vehicle is moving. However, the light emitted from such a unit may interfere with the vehicle operator's night vision. Moreover, traditional vehicle roof lighting units are often so simplified that they offer only direct illumination and therefore fail to light the entire vehicle and/or lack any subtlety of effect in illuminating the portions that the direct illumination can reach.

It is desirable to produce a vehicle roof lighting unit that provides for complete cabin lighting, especially in a manner that illuminates the entire cabin and sets a mood for the vehicle occupants without being so bright as to interfere with the occupants' night vision.

SUMMARY

Disclosed herein is a vehicle roof lighting unit. In one embodiment, the vehicle roof lighting unit comprises one or more direct light emitting elements, one or more indirect light emitting elements, and a control panel. Each of the one or more direct light emitting elements may be configured to illuminate a portion of the interior compartment, and each of the one or more direct light emitting elements may be located on the exterior of the vehicle roof lighting unit. Each of the one or more indirect light emitting elements may provide general lighting for the entire interior compartment, wherein the one or more indirect light emitting elements are concealed from view and the light from the one or more indirect light emitting elements reflects off a curved reflective structure. The control panel may be located on the exterior of the vehicle roof lighting unit.

In another disclosed embodiment, one or more waterfall direct light emitting elements are built into the control panel.

In another disclosed embodiment, the control panel is a touch control panel. In another disclosed embodiment, the control panel is attached to a surface that conceals the one or more indirect light emitting elements from view.

In another disclosed embodiment, at least one of the one or more light emitting elements is an LED light.

In another disclosed embodiment, the vehicle roof lighting unit is recessed into the vehicle roof.

In another disclosed embodiment, the one or more direct light emitting elements are spotlights.

In another disclosed embodiment, the vehicle roof lighting unit illuminates the cabin without requiring vehicle occupants to adjust their eyes to changed illumination levels.

In another disclosed embodiment, the light from the one or more indirect light emitting elements passes through a curved diffusive structure, wherein the curved diffusive structure is at least semi-transparent. In another disclosed embodiment, the curved diffusive structure is installed in front of or located to overlie the curved reflective structure.

Other aspects, features, and techniques will be apparent to one skilled in the relevant art in view of the following detailed description of the embodiments.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION

One aspect of the disclosure is directed to a vehicle roof lighting unit, wherein the vehicle roof lighting unit uses direct and indirect lighting and the light from the indirect lighting is reflected and diffused through a semi-transparent material.

References throughout this document to "one embodiment," "certain embodiments," "an embodiment," or similar term mean that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. For example, two or more of the innovative devices described herein may be combined in a single device, but the application is not limited to the specific exemplary combinations of vehicle roof lighting units that are described herein.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

A detailed description of various embodiments is provided; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the disclosed embodiments.

Figure 1:
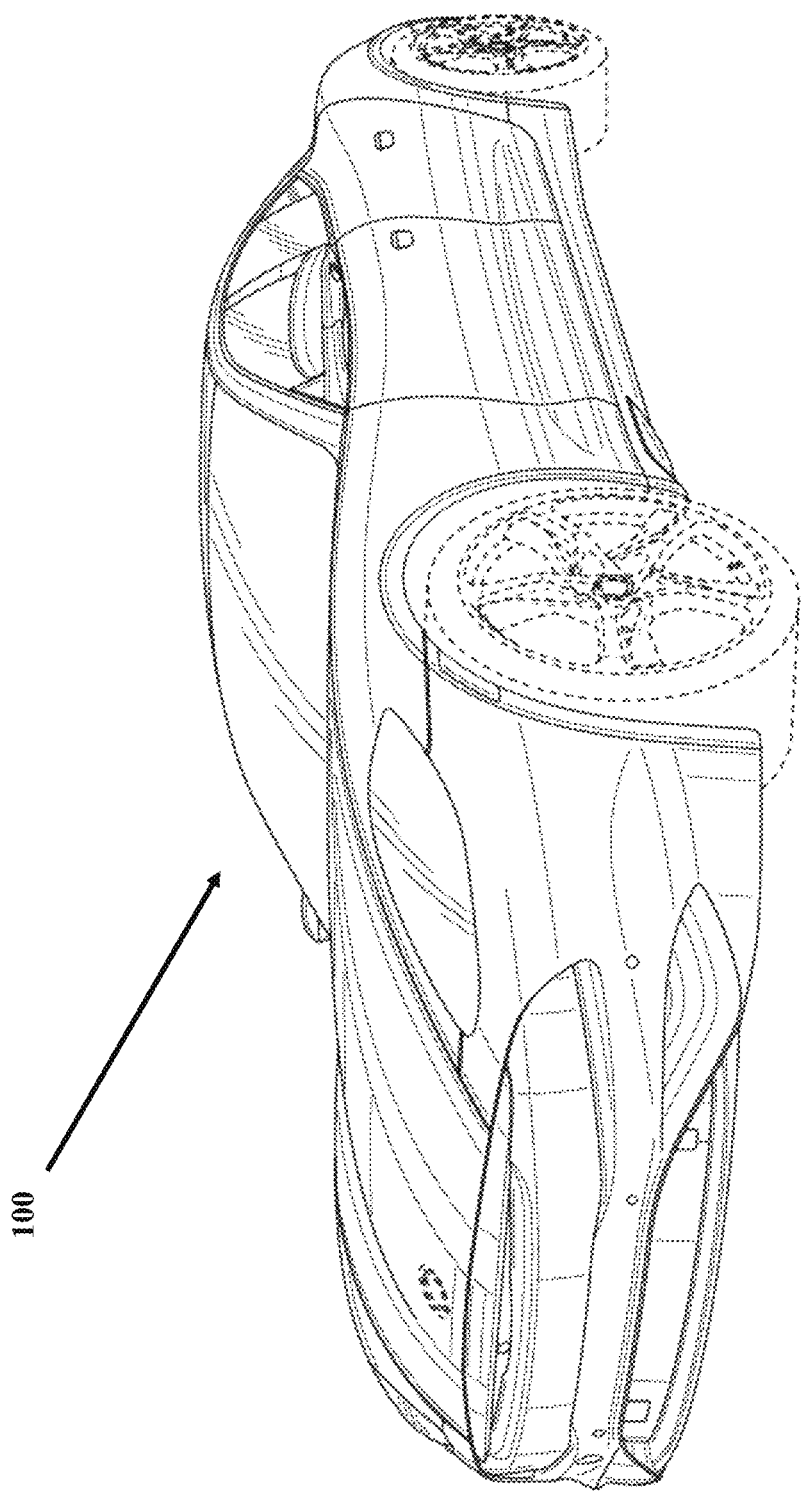
FIG. 1 is a perspective view of an exemplary embodiment of a vehicle including a vehicle roof lighting unit.

FIG. 1 is a perspective view of an exemplary embodiment of a vehicle 100 including a vehicle roof and a vehicle roof lighting unit 200. The vehicle roof lighting unit 200 described may be used with any passenger vehicle or other vehicle that makes use of interior lighting.

Figure 2:
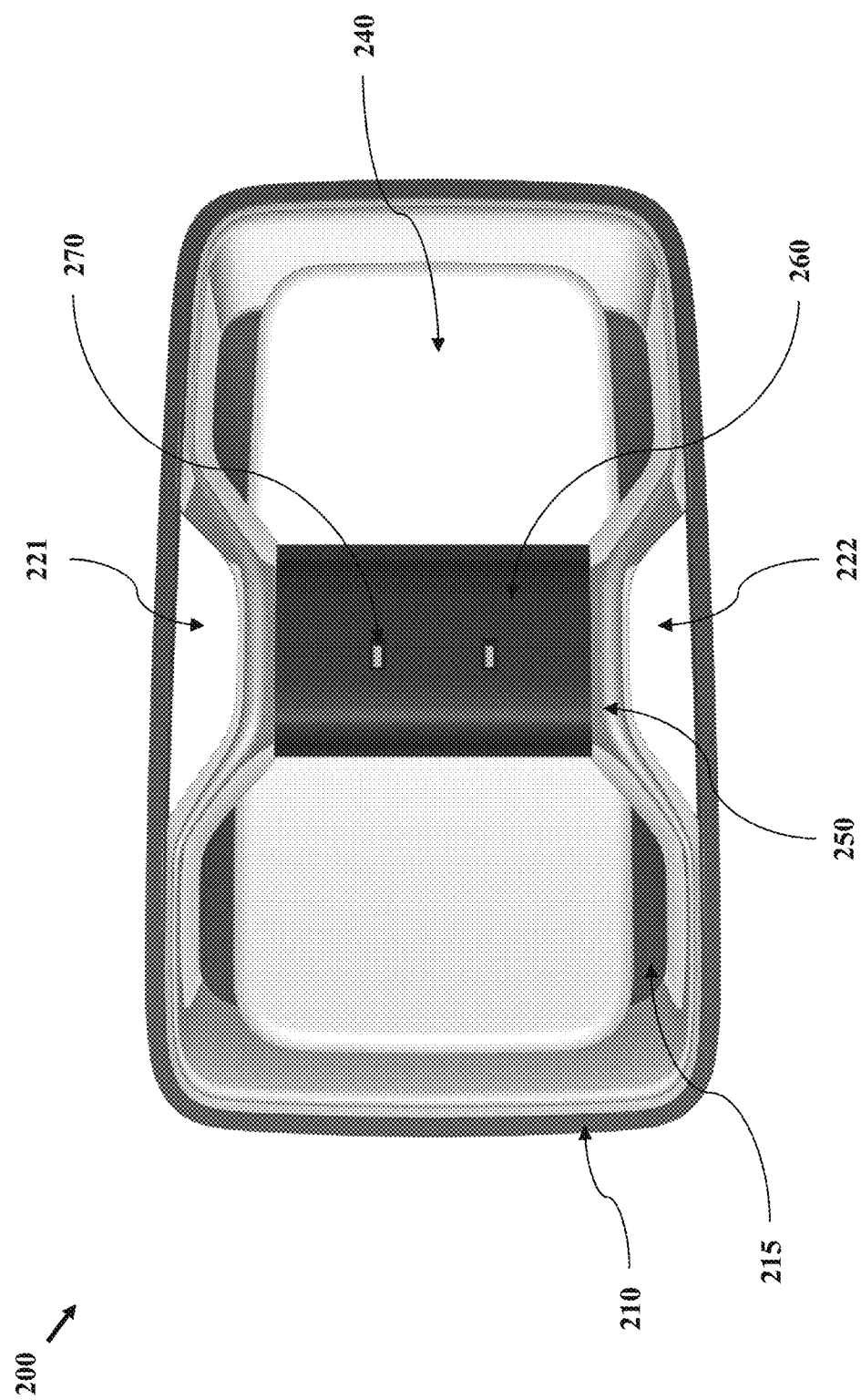
FIG. 2 is a perspective view of an exemplary embodiment of a vehicle roof lighting unit.
Figure 3:
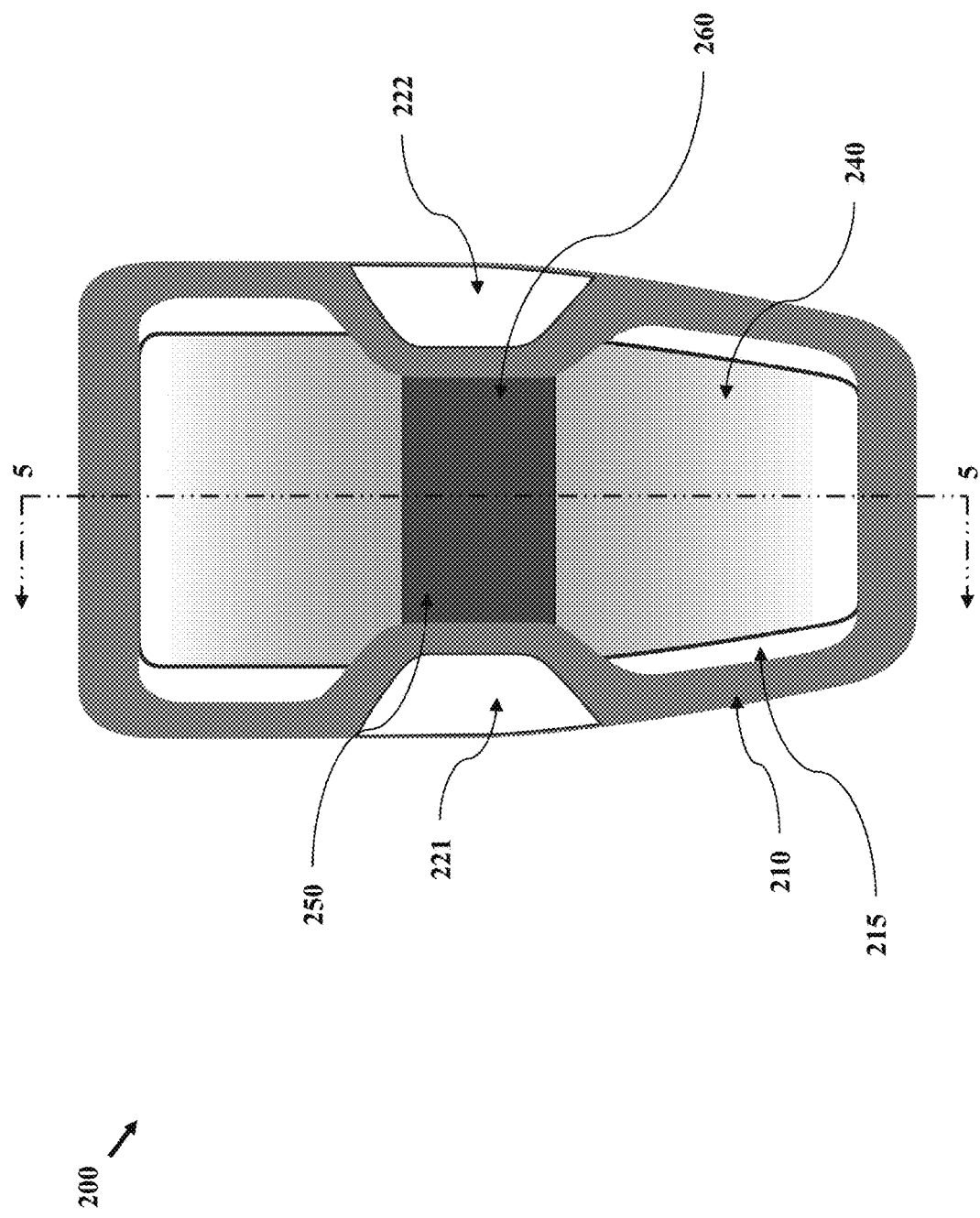
FIG. 3 is a bottom view of an exemplary embodiment of a vehicle roof lighting unit.

FIG. 2 is a perspective view of an exemplary embodiment of a vehicle roof lighting unit 200. FIG. 3 is a bottom view of the same exemplary embodiment of a vehicle roof lighting unit 200. According to one embodiment, the vehicle roof lighting unit 200 may include a housing with a frame 210 and a recessed dome 215. The frame 210 may run around the perimeter of the vehicle roof lighting unit 200 and may act as a decorative divide between the vehicle roof lighting unit 200 and the vehicle roof in which the vehicle roof lighting unit 200 is installed. The recessed dome 215 may be recessed into the vehicle roof such that only the part of the recessed dome 215 pertaining to reflecting light is visible from within the cabin of the vehicle 100.

According to one embodiment, the vehicle roof lighting unit 200 includes direct light emitting elements 221 and 222. The direct light emitting elements 221 and 222 may be spotlights and may be designed to directly illuminate a driver section or passenger section of the vehicle 100. As shown in FIG. 3, the spotlights are preferably mounted at the end of the bridge portion of the housing. The orientation of the lighting unit 200 (i.e., parallel to the direction of movement of the vehicle) and placement of the spotlights allows for each of the spotlights to be easily directed toward either the driver or passenger side of the vehicle.

According to another embodiment, the vehicle roof lighting unit 200 includes an indirect light emitting element 230 (see FIG. 5) and a curved reflective structure 240 installed over the visible portion of the recessed dome 215. The curved reflective structure 240 may be curved to match the curve of the recessed dome 215 and may reflect light from the indirect light emitting element 230 into the cabin of the vehicle 100. The curved reflective structure 240 may serve as a means to soften and scatter the light from the indirect light emitting element 230.

According to one embodiment, a bridge surface 250 may obstruct the direct light of the indirect light emitting element 250 from direct view, such that the only light from the indirect light emitting element 250 that is visible in the cabin is the indirect light reflected off of the curved reflective structure 240.

Figure 4:
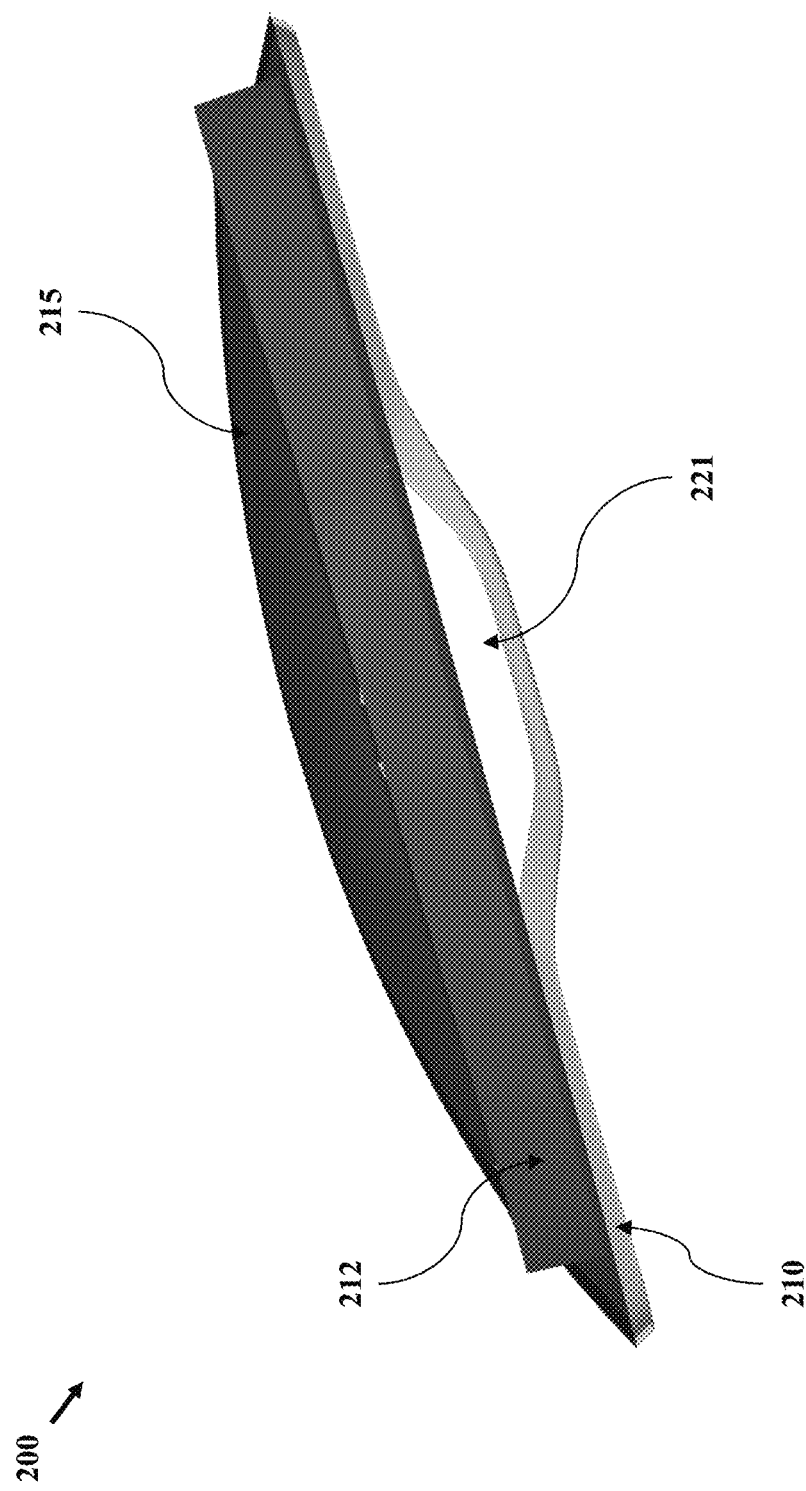
FIG. 4 is a side view of an exemplary embodiment of a vehicle roof lighting unit.
Figure 5:
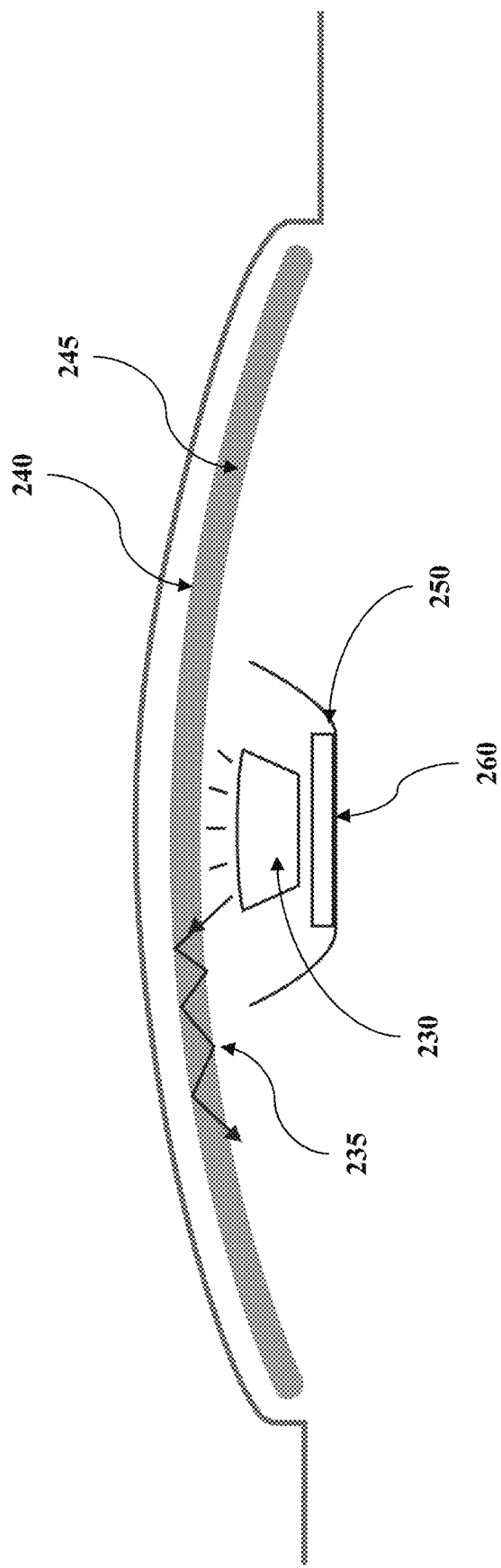
FIG. 5 is a sectioned side view of a variation of the vehicle roof lighting unit of FIG. 3, taken along the line 5-5.

According to one embodiment, a control panel 260 is attached to the bridge portion 250 of the housing on the side facing the cabin of the vehicle 100. The bridge portion is connected to an inwardly protruding portion of the frame 210. The control panel 260 may be a touch control panel, that includes control elements for activating and/or controlling the amount of illumination emitted by the light emitting elements. The control elements may be capacitive type touch detectors, resistive type touch detectors, or any other suitable means of registering touch contact, for example finger touch type contact. As shown in FIGS. 4 and 5, the bridge portion and the control panel span the reflective surface across the most recessed or deepest portion of the reflective surface.

According to one embodiment, the control panel 260 may have one or more waterfall direct light emitting elements 270 embedded into its surface. The one or more waterfall direct light emitting elements 270 may directly illuminate parts of the cabin of the vehicle 100 that aren't otherwise illuminated by the direct light emitting elements 221 and 222 or the indirect light emitting element 230. In one embodiment, the one or more waterfall direct light emitting elements 270 may always be on, in contrast to the direct light emitting elements 221 and 222 or the indirect lighting element 230, which may be turned on or off as needed.

According to one embodiment, one or more of the light emitting elements (direct light emitting elements 221 and 222, indirect light emitting element 230, and the one or more waterfall direct light emitting elements 270) may be an LED light.

FIG. 4 is a side view of an exemplary embodiment of a vehicle roof lighting unit 200. According to one embodiment, one of the direct light emitting elements 221 may be visible from one side, and the other direct lighting element 222 may be visible from the opposite side. The housing of the vehicle roof lighting unit 200 may include a structural frame 212 underneath the visible portion of the frame 210. The structural frame 212 may assist in mounting the vehicle roof lighting unit 200 to the vehicle roof and may be concealed from view once the vehicle roof lighting unit 200 is installed.

FIG. 5 is a sectioned side view of a variation of the vehicle roof lighting unit 200 of FIG. 3, taken along the line 5-5. According to one embodiment, the vehicle roof lighting unit may include a curved diffusive structure 245 placed in front of the curved reflective structure 240 such that the light 235 from the indirect light emitting element 230 passes through the curved diffusive structure 245 both before and after reflecting off of the curved reflective structure 240. The curved diffusive structure 245 may be mounted on top of or in a suitable manner to overlie the curved reflective structure 240. In this manner, the light 235 from the indirect light emitting element 230 may be further softened before entering the cabin of the vehicle 100.

According to another embodiment, the curved reflective structure 240 may be a reflective layer applied to the back side of the curved diffusive structure 245. This approach may simplify the construction of the vehicle roof lighting unit 200.

While this disclosure makes reference to exemplary embodiments, it will be understood by those skilled in the art that various changes in form and details may be made therein without departing from the scope of the claimed embodiments.

What is claimed is:

1. A vehicle roof lighting unit for illuminating an interior compartment of a vehicle, comprising:
    a housing supporting a curved at least semi-transparent diffusive structure overlying a concave reflective surface and, direct light emitting elements supported by the housing, wherein each of the direct light emitting elements are configured to illuminate a portion of the interior compartment, and wherein each of the direct light emitting elements are located on an exterior portion of the housing;
    one or more indirect light emitting elements mounted to the housing for providing general lighting for the entire interior compartment, wherein each of the one or more indirect light emitting elements are concealed from view and wherein the lighting unit is configured so that the light from the one or more indirect light emitting elements passes through the curved diffusive structure and then reflects off the concave reflective surface;
    wherein the housing includes a bridge spanning across the concave reflective surface, the bridge extending between a frame of the housing from a first location at the frame adjacent to a first direct light emitting element and a second location at the frame adjacent to a second direct emitting element, and wherein a control panel is mounted on the bridge portion; and wherein the bridge portion and the frame border first and second openings, wherein the first opening is located at one end of the frame and the second opening located at the other end of the frame, wherein the light from the one or more indirect light emitting elements passes through the first and second openings into the interior compartment of the vehicle, wherein the bridge connects two portions of the frame, wherein the frame is disposed radially inward relative to the rest of the frame at the two portions of the frame, and the one or more direct light emitting element are located where the frame is disposed radially inward.

2. The vehicle roof lighting unit of claim 1, wherein one or more waterfall direct light emitting elements are mounted on the bridge portion.

3. The vehicle roof lighting unit of claim 1, wherein the control panel includes buttons controlled by a finger touch.

4. The vehicle roof lighting unit of claim 1, wherein the bridge portion conceals the one or more indirect light emitting elements from view.

5. The vehicle roof lighting unit of claim 1, wherein at least one of the one or more of the direct and indirect light emitting elements is an LED light.

6. The vehicle roof lighting unit of claim 1, wherein the one or more direct light emitting elements are spotlights.

7. The vehicle roof lighting unit of claim 6, wherein each of the one or more spotlights are mounted at an end of the bridge portion.

8. The lighting unit of claim 1, wherein the concave reflective surface is configured so that the light emitted by the one or more indirect light emitting elements reflects off the concave reflective surface and back through the curved diffusive structure before illuminating the interior compartment of the vehicle.

9. A vehicle including a lighting unit mounted on an interior roof of a passenger compartment of the vehicle, wherein the vehicle roof lighting unit comprises:
a housing including a frame for supporting a curved semi-transparent diffusive structure overlying and placed in front of a concave reflector such that the diffusive structure is closer to the passenger compartment of the vehicle and
one or more direct light emitting elements supported by the housing, wherein each of the direct light emitting elements are configured to illuminate a portion of the interior compartment, and wherein the one or more direct light emitting elements are located on a portion of the housing facing the passenger compartment;
one or more indirect light emitting elements for providing general lighting for the entire passenger compartment, wherein the one or more indirect light emitting elements are concealed from view by a portion of the housing and wherein the lighting unit is configured so that the light from the one or more indirect light emitting elements reflects off the concave reflector after passing through the diffusive structure;
a control panel including control elements for activating one or more of the indirect and direct light emitting elements, wherein the control panel is located on the portion of the housing concealing the indirect light emitting elements; and
a bridge portion spanning from one side of the frame to another side of the frame and concealing the one or more indirect light emitting elements, wherein the bridge portion and the frame border first and second openings, and wherein the light from the one or more indirect light emitting elements enters the passenger compartment through the first and second openings, wherein the bridge connects two portions of the frame, wherein the frame is disposed radially inward relative to the rest of the frame at the two portions of the frame, and the one or more direct light emitting element are located where the frame is disposed radially inward.

10. The vehicle of claim 9, wherein the lighting unit further includes one or more waterfall direct light emitting elements mounted on the bridge portion.

11. The vehicle of claim 10, wherein the bridge portion spans the reflective surface across the most recessed portion of the reflective surface.

12. The vehicle of claim 9, wherein the control elements are finger touch activated elements.

13. The vehicle of claim 9, wherein at least one of the one or more of the direct and indirect light emitting elements is an LED light.

14. The vehicle of claim 9, wherein the one or more direct light emitting elements are spotlights.

15. The vehicle of claim 14, wherein each of the spotlights are mounted at an end of the bridge portion.

16. The vehicle of claim 9, wherein the concave reflector is configured so that the light emitted by the one or more indirect light emitting elements reflects off a surface of the concave reflector and back through the curved diffusive structure before illuminating the passenger compartment of the vehicle.

17. A vehicle roof lighting unit for illuminating an interior compartment of a vehicle, comprising:
a housing supporting a curved at least semi-transparent diffusive structure overlying a concave reflective surface and,
at least one direct light emitting elements supported by the housing, wherein each of the direct light emitting elements are configured to illuminate a portion of the interior compartment, and wherein each of the one or more direct light emitting elements are located on an exterior portion of the housing;
at least one indirect light emitting elements mounted to the housing for providing general lighting for the entire interior compartment, wherein each of the one or more indirect light emitting elements are concealed from view and wherein the lighting unit is configured so that the light from the one or more indirect light emitting elements passes through the curved diffusive structure and then reflects off the concave reflective surface; and
wherein the housing includes a bridge spanning across the concave reflective surface, the bridge extending between a frame of the housing such that the bridge obstructs light from the one or more indirect light emitting elements and the diffusive element is visible from the cabin at two openings located adjacent the lateral sides of the bridge, and wherein a control panel is mounted on the bridge portion, wherein the bridge connects two portions of the frame, wherein the frame is disposed radially inward relative to the rest of the frame at the two portions of the frame, and the one or more direct light emitting element are located where the frame is disposed radially inward.

* * * * *